No. 728,395. Patented May 19, 1903.

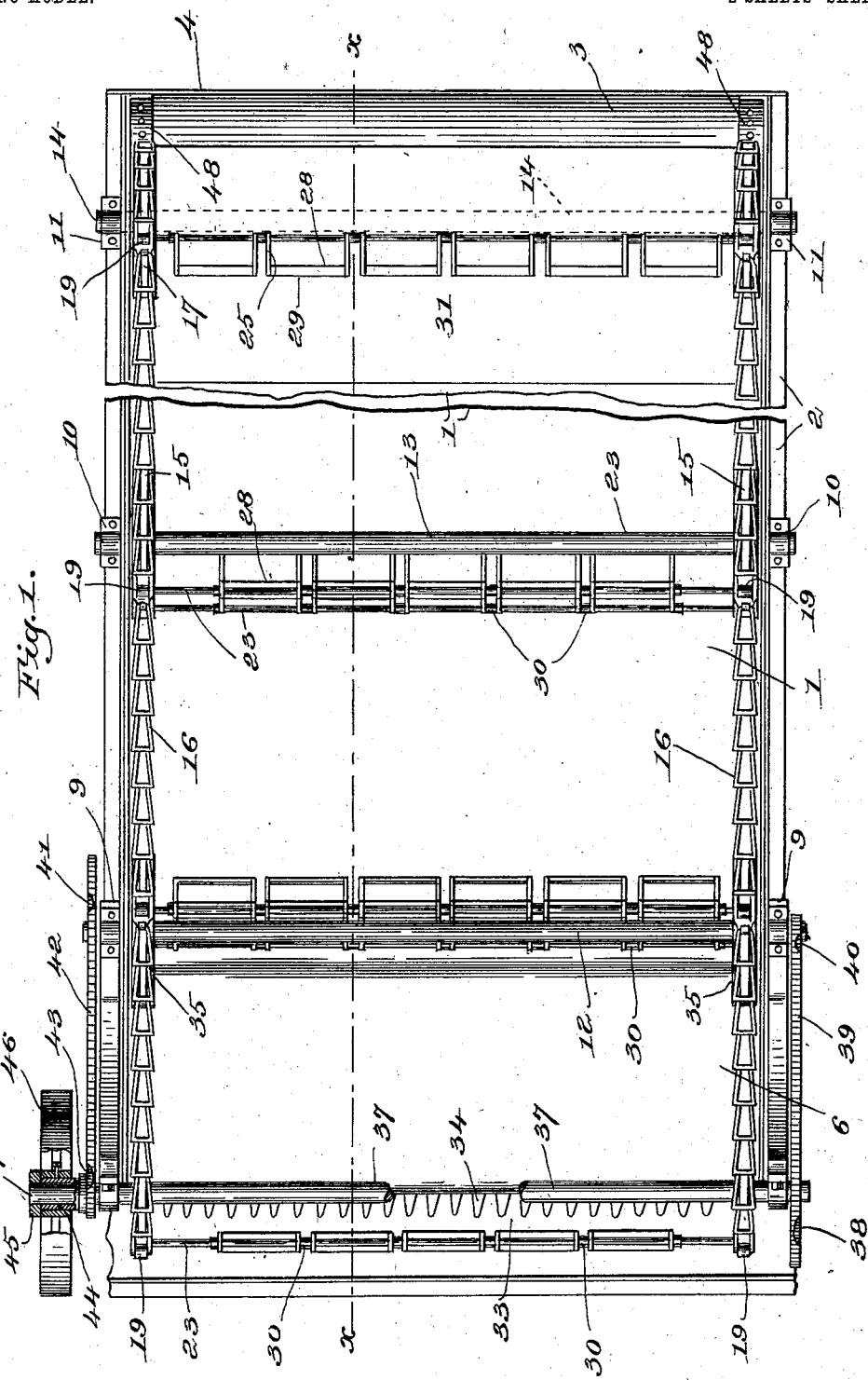

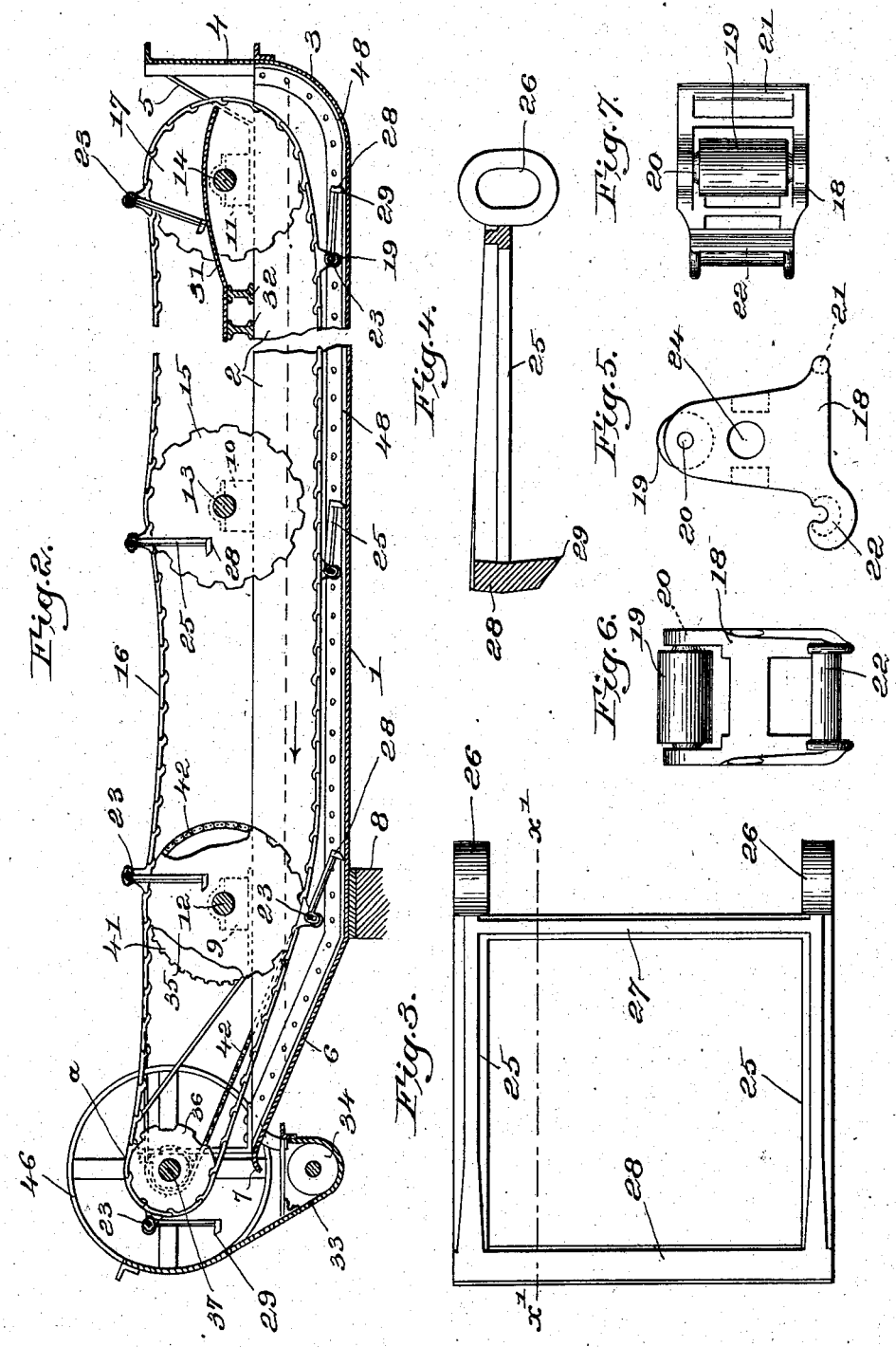

UNITED STATES PATENT OFFICE.

HENRY HOWARD, OF BROOKLINE, MASSACHUSETTS.

EVAPORATING APPARATUS.

SPECIFICATION forming part of Letters Patent No. 728,395, dated May 19, 1903.

Application filed May 24, 1900. Serial No. 17,811. (No model.)

*To all whom it may concern:*

Be it known that I, HENRY HOWARD, a citizen of the United States, and a resident of Brookline, county of Norfolk, State of Massachusetts, have invented an Improvement in Evaporating Apparatus, of which the following description, in connection with the accompanying drawings, is a specification, like numerals on the drawings representing like parts.

This invention relates more particularly to that class of apparatus designed for the evaporation of solutions which precipitate salts or solid matter during concentration—such, for instance, as in the manufacture of common salt, caustic soda, &c. In such apparatus the solution is concentrated in large open shallow pans, the contents of which are suitably heated, and as the salt or solid matter is deposited upon the pan-bottom it is removed therefrom from time to time by large hoes or scrapers manipulated by hand. This procedure is slow, and the salt or solid matter removed has a large quantity of liquid matter contained therein, owing to the fact that there is little opportunity afforded for drainage as the solid matter is removed.

My present invention has for its object the production of means for removing automatically and constantly the deposited solid matter from the evaporating-pan, such matter being carried over a drainage-surface prior to discharge, thereby permitting excess liquor to drain off back into the pan.

The various novel features of my invention will be hereinafter fully described, and particularly pointed out in the following claims.

Figure 1 is a top or plan view broken out transversely between its ends of an apparatus embodying one form of my present invention. Fig. 2 is a longitudinal sectional view thereof, also broken out, taken on the line *x x*, Fig. 1. Fig. 3 is an enlarged plan view of one of the scrapers to be described. Fig. 4 is a longitudinal sectional view thereof on the line *x' x'*, Fig. 3. Fig. 5 is an enlarged side view of one of the shaft-supporting links of the conveyer. Fig. 6 is a left-hand end elevation thereof, showing the supporting antifriction-roll; and Fig. 7 is a top or plan view thereof.

The evaporating-pan used in connection with my present invention is herein shown as comprising a bottom portion 1 and upright sides 2, suitably flanged and riveted together to make a comparatively shallow and long pan, the bottom at one end being upwardly curved, as at 3, to the top of the sides and continued above the same as an upright wall or guard 4, extended across that end of the pan and suitably braced, as at 5. At its opposite end the bottom is upwardly inclined, as at 6, from the flat bottom 1 up to the top of the sides, and in Fig. 2 said inclined portion is shown as terminating in a transversely-extended lip 7. The pan is mounted on suitable supports, only one of which, as 8, is shown in Fig. 2, and as the furnaces or heaters for heating the contents of the pan form no part of my invention I have omitted the same. I have mounted upon the pan sides at intervals bearings 9, 10, and 11 for transverse shafts 12, 13, and 14, respectively, the shaft 12 being located substantially above the end of the bottom 1, which is upwardly inclined, while the shaft 14 is located near the opposite end of the pan. The pan is shown as broken out between its ends in Figs. 1 and 2 to save space, and it will be understood that as many shafts similar to the shaft 13 as may be necessary will be interposed between the shafts 12 and 14. On the shaft 13, or as many of them as are used, are mounted two idler and guide sheaves 15 near the ends of the shafts, but within the upright sides 2 of the pan, and over these idler guide-sheaves are passed the upper runs of an endless conveyer, shown herein as comprising two like endless flexible members 16, which are preferably formed of metallic links jointed or articulated to give proper flexibility to the said members, they passing also around guide-sheaves 17, secured to the shaft 14 within the upright sides of the pan. At suitable intervals a special link 18 is inserted in each endless member of the conveyer, one of such special links being shown in enlarged detail in Figs. 5, 6, and 7, the body of the link being bifurcated to receive an antifriction-roll 19, journaled at 20 between the sides of the body of the link 18, and said body is provided with a cross-bar 21 for pivotal attachment to one of the adjacent links, while at its upper end the body is provided with a hook-like member 22 for pivotal connection with the other adjacent link. As shown in Fig. 5, the general construction of the body in side elevation is triangular, the cross-bar 21, hook 22, and roll 19 being located substantially at the angles of the triangle, and when these special links are in place, as shown in Fig. 2, they project either above the upper run or below the lower run of the conveyer, and when on the lower run the rolls 19 travel over the pan-bottom and prevent excessive friction and wear, as would be otherwise the case. Each oppositely-located pair of links 18 is connected by a transverse bar 23, secured in a hole 24, made in the body of each link 18, maintaining the endless flexible member 16 of the conveyer separated a constant distance.

On each of the transverse bars 23 I mount one or more scrapers, (shown separately in enlarged detail in Figs. 3 and 4,) each scraper being shown preferably as a casting having parallel side arms 25, having at one end elongated eyes or loops 26 and connected by a cross-bar 27, while at the other end the arms are connected by a heavy cross-bar 28, having its lower edge beveled, as at 29, Fig. 4, to form a species of hoe. The eyes or loops 26 receive the transverse bar 23, connecting the flexible members of the conveyer, and said eyes or loops are elongated to permit of a rocking or tilting movement of the scraper upon the bar about an axis parallel to the direction of movement of the conveyer, as well as permitting its free pivotal movement thereon about an axis transverse to the direction of movement of the conveyer.

In Fig. 1 I have shown a number of scrapers arranged side by side on each of the transverse bars 23, the adjacent scrapers being separated by collars 30 on the bar interposed between each pair of scrapers. In Fig. 2 a number of the scrapers are shown in operative position traveling over the pan-bottom to collect the salts or solid matter deposited upon the pan-bottom by concentration or evaporation of the liquor therein, the direction of travel of the lower run of the conveyer being shown by the arrow in Fig. 2, and by referring to said Fig. 2 it will be noticed that when the bars 23 are on the upper run of the conveyer the scrapers will depend, but the members 16 will be supported by the guide-sheaves at a sufficient height to make the operation satisfactory. As the scrapers pass from the upper to the lower run of the conveyer at the right-hand end of the pan, viewing Figs. 1 and 2, it is necessary to act upon the scrapers successively to swing them bodily upon their transverse supports 23 in such manner that when they reach the bottom of the pan they will be in proper scraping position, and for this purpose I have inserted a scraper-positioning device between the guide and supporting sheaves 17, said device being shown as a slightly-concaved plate 31, mounted on supports 32 and extended over the shaft 14.

As the scrapers of a set approach this end of the pan they engage the upper or convex surface of the device 31 and are gradually brought into a substantially horizontal position, and after the transverse bar 23 passes below the outer end of the positioning device 31 the scrapers will swing over and outward against the upright guard 4, which latter prevents the scrapers from catching on the end of the pan, and then as the bars 23 move onto the lower run the scrapers will fall into proper position to sweep over the bottom of the pan. As the solid matter is collected by the scrapers in their movement over the pan-bottom it is carried along and up the inclined portion 6, which projects above the level of the liquid in the pan, so that the solid matter will have an opportunity to drain as it is carried up toward the discharge or delivery end of the pan, the excess or surplus liquor running back into the main body in the pan. As the scrapers reach the upper end of the inclined portion 6 they push the solid matter over the lip 7 into a transverse trough or receptacle 33, extended beneath the delivery end of the pan, and in Figs. 1 and 2 I have shown the trough as provided with a conveyer 34, which by its rotation serves to carry the contents of the trough to one end to be there discharged into suitable receptacles or to be otherwise disposed of.

The shaft 12 has loosely mounted upon it two like supporting and guide sheaves 35 for the endless member 16 of the conveyer, it being noted by reference to Fig. 2 that the diameter of these sheaves is such that not only will the scrapers when on the upper run be held up out of range of the shaft 12 or of the lower run of the conveyer, but also that the lower run will be maintained in proper position in the pan to prevent lifting of the lower run from one end of the pan to the other to such an extent as to prevent proper action of the scrapers. The bights of the conveyer members 16 beyond the sheaves 35 pass around driving-sprockets 36, one of which is best shown in Fig. 2, fast on a shaft 37, mounted in suitable bearings in the pan, and by means of which driving-sheaves the endless conveyer is moved longitudinally of the pan, the draft being applied to the lower run of the conveyer.

Referring now to Fig. 1, the shaft 37 has fast upon it at one end, beyond the pan side, a large sprocket-wheel 38, connected by a chain or other driving belt 39 with a small or pinion sprocket 40, fast on the shaft 12, outside of its bearing 9, and said shaft at its other end has fast therein beyond the pan a large sprocket-wheel 41, connected by a chain or other belt 42 with a small sprocket 43, secured to or forming part of a sleeve 44, loosely mounted on the shaft 37 and held in place thereon by a collar 45. The sleeve 44 is also provided with a belt-pulley 46, by which rotation is imparted to the sleeve from any suitable source of power. (Not shown.) Now rotation of the sleeve 44 will, through the sprocket 43 and belt 42, rotate the shaft 12 at a slow speed, and the speed of the shaft 37 will be still further reduced by the transmitting means, comprising the small sprocket-wheel 40, belt 39, and large sprocket-wheel 38. The speed of rotation of the shaft 37, which is the driving-shaft for the conveyer, is thus reduced to the desired speed without rendering necessary very slow rotation of the belt-pulley 46.

I prefer to arrange successive sets of scrapers in staggered order, as shown in Fig. 1, to prevent the same from forming ridges or furrows in the solid material on the bottom of the pan. The pan-bottom will become by usage warped or somewhat buckled, due to the heat and wear, and it is necessary in view of such inequalities to mount the scrapers flexibly, as it were, on their transverse bars—as, for instance, by the elongated eyes or loops 26, hereinbefore referred to. This form of connection between the scraper and the conveyer permits the scraper to adapt itself to the contour of the pan-bottom and to most effectually clear or scrape the same of the solid matter as it is deposited thereon. The rolls 19 of the special links preferably travel upon the tops of the inturned flanges 48 at the lower edges of the upright sides 2 of the pan.

Having described my invention, what I claim as new, and desire to secure by Letters Patent, is—

1. In apparatus of the class described, an evaporating-pan, an endless conveyer movable longitudinally and adjacent the bottom thereof, a series of scrapers pivotally connected to said conveyer, means to actuate the latter, a scraper-positioning device adapted to be engaged by the scrapers as they pass from the upper to the lower run of the conveyer, and to swing them into operative position, and a guard registering with the end wall of the pan and serving to limit the swinging movement of said scrapers.

2. In apparatus of the class described, an elongated evaporating-pan, a traveling conveyer comprising two endless flexible members located near the opposite sides of the pan, actuating means for the conveyer, transverse bars connecting the two endless members, a plurality of scrapers pivotally mounted on each of the bars and adapted when on the lower run to sweep over the pan-bottom, a scraper-positioning device adapted to be engaged by each of the scrapers as they pass from the upper to the lower run of the conveyer, and operating to swing the scrapers into operative position, and a guard registering with the end wall of the pan and directing the scrapers into the pan.

3. In apparatus of the class described, an elongated evaporating-pan, a traveling conveyer comprising two endless flexible members located near the opposite sides of the pan, the lower runs of said members traveling between the sides of the pan, a series of links in each member provided with supporting-rolls, transverse bars connecting opposite pairs of said links, one or more scrapers pivotally mounted on each of said bars, to sweep the pan-bottom when on the lower run of the conveyer, the rolls at such time preventing engagement of the endless members and the pan-bottom, and means to actuate the conveyer.

4. In apparatus of the class described, an elongated evaporating-pan, a traveling conveyer comprising two endless, articulated members arranged in parallelism longitudinally of the pan, and between the opposite sides thereof, pairs of oppositely-located links forming parts of said members, said links being provided with supporting-rolls, a transverse bar connecting each pair of such links, one or more scrapers flexibly mounted on said bars, to sweep the pan-bottom when on the lower run of the conveyer, and means to apply draft to the lower run thereof, said supporting-rolls operating to space the lower run of the conveyer from the pan-bottom.

5. In apparatus of the class described, an evaporating-pan, a plurality of endless, flexible conveyer members movable in parallelism, cross-bars connecting them, rotatable idlers to support and guide the upper runs of the said members, driving-sheaves for the latter, and a plurality of scrapers mounted on each of the cross-bars, each scraper comprising a transverse blade, parallel side arms having elongated openings to receive the cross-bar, and a rigid connection between the side arms at or near their inner ends.

6. In apparatus of the class described, an elongated, shallow evaporating-pan having one end upturned to form a scraper-guard, the bottom of the pan at the opposite end being upwardly inclined to substantially the level of the pan sides, an endless conveyer mounted above the pan and comprising a plurality of endless, flexible members arranged in parallelism and connected at intervals by transverse bars, rotatable guide-supports for said members to maintain the lower run of the conveyer adjacent the pan-bottom, scrapers pivotally mounted on the cross-bars, and a device to position the scrapers as they pass from the upper to the lower run of the conveyer adjacent the upturned scraper-guard.

7. In an apparatus of the class described, a pan having its bottom upwardly inclined at one end, an endless conveyer longitudinally movable throughout a portion of its length adjacent the bottom of the pan, a series of scrapers pivotally and flexibly connected with the conveyer, means to actuate the latter, a scraper-positioning device adapted to be engaged by said scrapers as they pass from the upper to the lower run of the conveyer, and a guard registering with the end wall of the pan and serving to limit the movement of said scrapers as they swing into operative position.

8. In an apparatus of the class described, an evaporating-pan, an endless conveyer movable longitudinally of the pan, and comprising two parallel, endless flexible members connected by a series of transverse bars, scrapers mounted on said bars, a shaft having driving members fast thereon for said conveyer members, a large sprocket-wheel fast on one end of the shaft, a sleeve loose on the other end of the shaft, having a driving-pulley and a small attached sprocket-wheel, a second parallel shaft having two guide members loose thereon to guide and support the upper and lower runs of said conveyer members, a large sprocket-wheel fast on one end of said shaft and operatively connected with the small sleeve-sprocket, a small sprocket fast on the opposite end of the second shaft, and a flexible power-transmitting connection between it and the large sprocket on the first-mentioned shaft, whereby the latter is driven by or through the connections between it and the driving-pulley on the loose sleeve.

9. In apparatus of the class described, an evaporating-pan, an endless conveyer movable longitudinally thereof, a series of scrapers, and means to connect them to said conveyer and permit independent rocking movement of the separate scrapers about axes substantially parallel to the direction of movement of the conveyer.

10. In apparatus of the class described, an evaporating-pan, a series of scrapers, means to move the series longitudinally of the pan, connections between said means and the series of scrapers, each of said scrapers being movable on the connections about axes both parallel and transverse to the direction of movement, whereby the scrapers may adapt themselves to the bottom of the pan.

11. In apparatus of the class described, an evaporating-pan, an endless conveyer movable longitudinally and adjacent the bottom thereof, a series of scrapers connected to said conveyer, and means to permit a rocking movement of the scrapers about an axis substantially parallel to the direction of movement of the conveyer, and also a swinging movement about an axis transverse thereto.

In testimony whereof I have signed my name to this specification in the presence of two subscribing witnesses.

HENRY HOWARD.

Witnesses:
JOHN C. EDWARDS,
AUGUSTA E. DEAN.